United States Patent
Bharadwaj

(10) Patent No.: US 8,713,165 B2
(45) Date of Patent: Apr. 29, 2014

(54) METHOD AND SYSTEM FOR PROVIDING STATUS OF A MACHINE

(75) Inventor: Narayan Bharadwaj, Fremont, CA (US)

(73) Assignee: salesforce.com, inc., San Francisco, CA (US)

( * ) Notice: Subject to any disclaimer, the term of this patent is extended or adjusted under 35 U.S.C. 154(b) by 191 days.

(21) Appl. No.: 13/109,781

(22) Filed: May 17, 2011

(65) Prior Publication Data

US 2012/0226803 A1 Sep. 6, 2012

Related U.S. Application Data

(60) Provisional application No. 61/448,977, filed on Mar. 3, 2011.

(51) Int. Cl.
*G06F 15/16* (2006.01)
*H04L 12/26* (2006.01)
*H04L 12/24* (2006.01)

(52) U.S. Cl.
CPC ........ *H04L 12/2602* (2013.01); *H04L 12/2408* (2013.01); *H04L 12/2642* (2013.01); *H04L 12/2689* (2013.01); *H04L 43/00* (2013.01); *H04L 43/0817* (2013.01)
USPC .......................................... 709/224; 709/201

(58) Field of Classification Search
CPC .................................................. H04L 12/2602
USPC ........................................................ 709/224
See application file for complete search history.

(56) References Cited

U.S. PATENT DOCUMENTS

| | | |
|---|---|---|
| 5,577,188 A | 11/1996 | Zhu |
| 5,608,872 A | 3/1997 | Schwartz |
| 5,649,104 A | 7/1997 | Carleton |
| 5,715,450 A | 2/1998 | Ambrose et al. |
| 5,761,419 A | 6/1998 | Schwartz |
| 5,819,038 A | 10/1998 | Carleton |
| 5,821,937 A | 10/1998 | Tonelli et al. |
| 5,831,610 A | 11/1998 | Tonelli et al. |
| 5,873,096 A | 2/1999 | Lim et al. |
| 5,918,159 A | 6/1999 | Fomukong et al. |
| 5,963,953 A | 10/1999 | Cram et al. |
| 5,983,227 A | 11/1999 | Nazem et al. |
| 6,092,083 A | 7/2000 | Brodersen et al. |

(Continued)

OTHER PUBLICATIONS

Saba, "Saba Announces Revolutionary Social Enterprise Platform," Press Release, Mar. 20, 2012, pp. 1-4, Redwood Shores, California.

*Primary Examiner* — Tauqir Hussain
(74) *Attorney, Agent, or Firm* — Dergosits & Noah LLP; Todd A. Noah

(57) ABSTRACT

A method for providing machine status information via an enterprise social network is disclosed. The method embodiment includes receiving by a server a status update message from a machine where the status update message includes an identifier of the machine and an indication of a status update of the machine. The server is configured to determine information identifying a first user from a database system, where the first user follows a status of the machine, and to post a notification message in a feed on a web page associated with the first user. In an embodiment, the notification message identifies the machine and includes the status update of the machine. By posting the status update on the first user's web page, the first user is notified of the status of the machine.

20 Claims, 8 Drawing Sheets

(56) References Cited

U.S. PATENT DOCUMENTS

| | | |
|---|---|---|
| 6,169,534 B1 | 1/2001 | Raffel et al. |
| 6,178,425 B1 | 1/2001 | Brodersen et al. |
| 6,189,011 B1 | 2/2001 | Lim et al. |
| 6,216,133 B1 | 4/2001 | Masthoff et al. |
| 6,216,135 B1 | 4/2001 | Brodersen et al. |
| 6,233,617 B1 | 5/2001 | Rothwein et al. |
| 6,236,978 B1 | 5/2001 | Tuzhilin et al. |
| 6,266,669 B1 | 7/2001 | Brodersen et al. |
| 6,288,717 B1 | 9/2001 | Dunkle et al. |
| 6,295,530 B1 | 9/2001 | Ritchie et al. |
| 6,324,568 B1 | 11/2001 | Diec et al. |
| 6,324,693 B1 | 11/2001 | Brodersen et al. |
| 6,336,137 B1 | 1/2002 | Lee et al. |
| D454,139 S | 3/2002 | Feldcamp et al. |
| 6,367,077 B1 | 4/2002 | Brodersen et al. |
| 6,393,605 B1 | 5/2002 | Loomans |
| 6,405,220 B1 | 6/2002 | Brodersen et al. |
| 6,411,949 B1 | 6/2002 | Schaffer et al. |
| 6,434,550 B1 | 8/2002 | Warner et al. |
| 6,446,089 B1 | 9/2002 | Brodersen et al. |
| 6,535,909 B1 | 3/2003 | Rust |
| 6,549,908 B1 | 4/2003 | Loomans |
| 6,553,563 B2 | 4/2003 | Ambrose et al. |
| 6,560,461 B1 | 5/2003 | Fomukong et al. |
| 6,574,635 B2 | 6/2003 | Stauber et al. |
| 6,577,726 B1 | 6/2003 | Huang et al. |
| 6,601,087 B1 | 7/2003 | Zhu |
| 6,604,117 B2 | 8/2003 | Lim et al. |
| 6,604,128 B2 | 8/2003 | Diec |
| 6,609,150 B2 | 8/2003 | Lee et al. |
| 6,621,834 B1 | 9/2003 | Scherpbier |
| 6,654,032 B1 | 11/2003 | Zhu |
| 6,665,648 B2 | 12/2003 | Brodersen et al. |
| 6,665,655 B1 | 12/2003 | Warner et al. |
| 6,684,438 B2 | 2/2004 | Brodersen et al. |
| 6,711,565 B1 | 3/2004 | Subramaniam et al. |
| 6,724,399 B1 | 4/2004 | Katchour et al. |
| 6,728,702 B1 | 4/2004 | Subramaniam et al. |
| 6,728,960 B1 | 4/2004 | Loomans et al. |
| 6,732,095 B1 | 5/2004 | Warshavsky et al. |
| 6,732,100 B1 | 5/2004 | Brodersen et al. |
| 6,732,111 B2 | 5/2004 | Brodersen et al. |
| 6,754,681 B2 | 6/2004 | Brodersen et al. |
| 6,763,351 B1 | 7/2004 | Subramaniam et al. |
| 6,763,501 B1 | 7/2004 | Zhu |
| 6,768,904 B2 | 7/2004 | Kim |
| 6,782,383 B2 | 8/2004 | Subramaniam et al. |
| 6,804,330 B1 | 10/2004 | Jones et al. |
| 6,826,565 B2 | 11/2004 | Ritchie et al. |
| 6,826,582 B1 | 11/2004 | Chatterjee et al. |
| 6,826,745 B2 | 11/2004 | Coker |
| 6,829,655 B1 | 12/2004 | Huang et al. |
| 6,842,748 B1 | 1/2005 | Warner et al. |
| 6,850,895 B2 | 2/2005 | Brodersen et al. |
| 6,850,949 B2 | 2/2005 | Warner et al. |
| 6,907,566 B1 | 6/2005 | McElfresh et al. |
| 7,100,111 B2 | 8/2006 | McElfresh et al. |
| 7,269,590 B2 | 9/2007 | Hull et al. |
| 7,340,411 B2 | 3/2008 | Cook |
| 7,373,599 B2 | 5/2008 | McElfresh et al. |
| 7,406,501 B2 | 7/2008 | Szeto et al. |
| 7,454,509 B2 | 11/2008 | Boulter et al. |
| 7,599,935 B2 | 10/2009 | La Rotonda et al. |
| 7,603,331 B2 | 10/2009 | Tuzhilin et al. |
| 7,620,655 B2 | 11/2009 | Larsson |
| 7,644,122 B2 | 1/2010 | Weyer et al. |
| 7,668,861 B2 | 2/2010 | Steven |
| 7,698,160 B2 | 4/2010 | Beaven et al. |
| 7,747,648 B1 | 6/2010 | Kraft et al. |
| 7,801,971 B1 * | 9/2010 | Amidon et al. ............... 709/217 |
| 7,827,208 B2 | 11/2010 | Bosworth et al. |
| 7,945,653 B2 | 5/2011 | Zuckerberg et al. |
| 8,005,896 B2 | 8/2011 | Cheah et al. |
| 8,010,663 B2 | 8/2011 | Firminger et al. |
| 8,082,301 B2 | 12/2011 | Ahlgren et al. |
| 8,095,413 B1 | 1/2012 | Beaven et al. |
| 8,095,594 B2 | 1/2012 | Beaven et al. |
| 8,103,611 B2 | 1/2012 | Tuzhilin et al. |
| 8,150,913 B2 | 4/2012 | Cheah et al. |
| 8,275,836 B2 | 9/2012 | Beaven et al. |
| 8,346,864 B1 * | 1/2013 | Amidon et al. ............... 709/204 |
| 2001/0044791 A1 | 11/2001 | Richter et al. |
| 2002/0072951 A1 | 6/2002 | Lee et al. |
| 2002/0082892 A1 | 6/2002 | Raffel |
| 2002/0129352 A1 | 9/2002 | Brodersen et al. |
| 2002/0140731 A1 | 10/2002 | Subramaniam et al. |
| 2002/0143997 A1 | 10/2002 | Huang et al. |
| 2002/0162090 A1 | 10/2002 | Parnell et al. |
| 2002/0165742 A1 | 11/2002 | Robbins |
| 2003/0004971 A1 | 1/2003 | Gong |
| 2003/0018705 A1 | 1/2003 | Chen et al. |
| 2003/0018830 A1 | 1/2003 | Chen et al. |
| 2003/0066031 A1 | 4/2003 | Laane et al. |
| 2003/0066032 A1 | 4/2003 | Ramachandran et al. |
| 2003/0069936 A1 | 4/2003 | Warner et al. |
| 2003/0070000 A1 | 4/2003 | Coker et al. |
| 2003/0070004 A1 | 4/2003 | Mukundan et al. |
| 2003/0070005 A1 | 4/2003 | Mukundan et al. |
| 2003/0074418 A1 | 4/2003 | Coker et al. |
| 2003/0120675 A1 | 6/2003 | Stauber et al. |
| 2003/0151633 A1 | 8/2003 | George et al. |
| 2003/0159136 A1 | 8/2003 | Huang et al. |
| 2003/0187921 A1 | 10/2003 | Diec et al. |
| 2003/0189600 A1 | 10/2003 | Gune et al. |
| 2003/0204427 A1 | 10/2003 | Gune et al. |
| 2003/0206192 A1 | 11/2003 | Chen et al. |
| 2004/0001092 A1 | 1/2004 | Rothwein et al. |
| 2004/0015981 A1 | 1/2004 | Coker et al. |
| 2004/0027388 A1 | 2/2004 | Berg et al. |
| 2004/0128001 A1 | 7/2004 | Levin et al. |
| 2004/0179654 A1 * | 9/2004 | Boetje et al. ................. 379/9.03 |
| 2004/0186860 A1 | 9/2004 | Lee et al. |
| 2004/0193510 A1 | 9/2004 | Catahan et al. |
| 2004/0199489 A1 | 10/2004 | Barnes-Leon et al. |
| 2004/0199536 A1 | 10/2004 | Barnes-Leon et al. |
| 2004/0249854 A1 | 12/2004 | Barnes-Leon et al. |
| 2004/0260534 A1 | 12/2004 | Pak et al. |
| 2004/0260659 A1 | 12/2004 | Chan et al. |
| 2004/0268299 A1 | 12/2004 | Lei et al. |
| 2005/0050555 A1 | 3/2005 | Exley et al. |
| 2005/0091098 A1 | 4/2005 | Brodersen et al. |
| 2007/0192410 A1 * | 8/2007 | Liversidge et al. ........... 709/204 |
| 2008/0294678 A1 * | 11/2008 | Gorman et al. ............... 707/102 |
| 2010/0262658 A1 * | 10/2010 | Mesnage ....................... 709/204 |
| 2011/0093743 A1 * | 4/2011 | Arcese et al. .................. 714/18 |
| 2011/0196922 A1 * | 8/2011 | Marcucci et al. ............. 709/204 |
| 2012/0042013 A1 * | 2/2012 | Roman et al. ................. 709/204 |

\* cited by examiner

METHOD AND SYSTEM FOR PROVIDING STATUS OF A MACHINE

CLAIM OF PRIORITY

This application claims the benefit of U.S. Provisional Patent Application 61/448,977, entitled SYSTEMS AND METHODS FOR HUMAN-MACHINE INTERACTION ON AN ONLINE SOCIAL NETWORK, by Narayan Bharadwaj, filed Mar. 3, 2011, the entire contents of which are incorporated herein by reference.

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

FIELD OF THE INVENTION

One or more implementations relate generally to tracking and providing status information of a machine.

BACKGROUND

The subject matter discussed in the background section should not be assumed to be prior art merely as a result of its mention in the background section. Similarly, a problem mentioned in the background section or associated with the subject matter of the background section should not be assumed to have been previously recognized in the prior art. The subject matter in the background section merely represents different approaches, which in and of themselves may also be inventions.

A typical enterprise relies on a multitude of machines to perform everyday functions, such as managing data, serving web content, collecting, analyzing and distributing information, and the like. The machines can include electronic devices, such as servers and computers, as well as software components, e.g., applications, hosted by the electronic devices. With the increasing role that computers play in today's business environment, a single server failure can effect a significant number of enterprise applications and debilitate an organization for days. Thus, much attention has been directed to preventing such a failure, and if such a failure does occur, to devising ways to minimize downtime.

Typically, an enterprise can utilize monitoring products to monitor the statuses of its machines and applications. For example, some monitoring products can be installed within a machine and can monitor the status of the machine, while other monitoring products can monitor many machines by collecting data from the machines over a network. Typically when a triggering issue is detected, e.g., the monitoring product receives an indication that a machine is performing at its capacity, the monitoring product can provide an alert to a human administrator who is responsible for maintaining the machine. For example, the alert can be sent to the administrator in a text and/or an email message.

Once the administrator is notified of the issue, a resolution procedure can be implemented. Typically, the administrator works with a team of human technicians, software and hardware, to resolve the issue, and typically these people are located in various buildings and/or places. Efficient and collaborative problem solving between team members can minimize, or more importantly, prevent system downtime. Communication between team members, however, can be cumbersome because it is typically conducted through telephone calls and/or email and text messages. None are optimal tools for efficient and collaborative problem solving.

BRIEF DESCRIPTION OF THE DRAWINGS

In the following drawings like reference numbers are used to refer to like elements. Although the following figures depict various examples, the one or more implementations are not limited to the examples depicted in the figures.

FIG. 4C illustrates a graphical user interface representing a webpage associated with a user according to yet another exemplary embodiment;

FIG. 5 illustrates a graphical user interface representing a webpage associated with a group according to yet another exemplary embodiment;

DETAILED DESCRIPTION

General Overview

Figure 1:
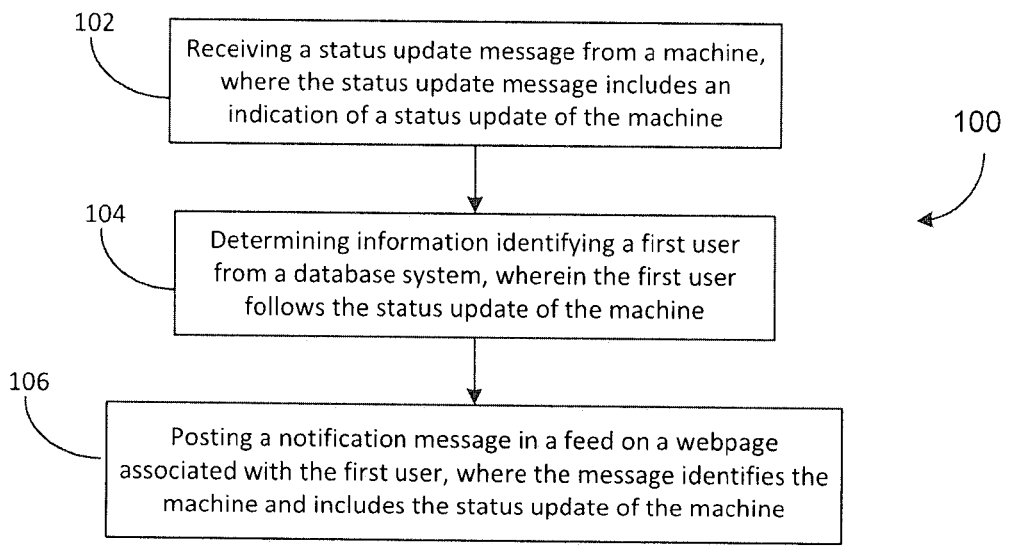
FIG. 1 is an operational flow diagram illustrating a high level overview of a technique for providing machine status information according to an embodiment.

Systems and methods are provided for providing machine status information via an enterprise social network. Well known consumer social networks allow a human user to interact with other human users by posting personal status updates on his or her respective home web page. The updates are then published to other users who are registered to receive information provided by the posting user. Users registered to receive such information are referred to as "followers" of the posting user. In addition, a collection of human users can form a group wherein the human users are considered members of the group. In this case, any member can post status updates on a home web page associated with the group, and the updates are published to the other members of the group who are presumptively following the group.

Typically, a follower can view the posting user's update on the follower's respective home web page and/or can navigate to the posting user's web page. Any follower can post a comment to the update on the follower's home web page, which is then published to the posting user and to user's following the posting follower. A single update or post can spawn several comments, each of which can generate several more conversations.

Typically, updates and associated comments are displayed in a list referred to as a "feed" or "newsfeed." The terms "feed" and "newsfeed" are used interchangeably. A user's home web page can include a feed that shows a list of activities or updates performed by the user and by other users followed by the user. In most cases, the updates can be displayed in chronological order or can be sorted based on other criteria. When comments to an update are received, they are typically associated with the originating update and displayed immediately following the originating update in chronological order. In this manner, interactions relating to a particular update are grouped and displayed as a conversation regardless of when the comments were received or posted. Accordingly, the user's feed can display several independent conversations, and the user can choose to participate in one or more conversations independently and/or simultaneously.

Enterprises, such as companies and educational institutions, are realizing the usefulness of social networks as a communications channel between employees. For example, private enterprise social networks, e.g., CHATTER® developed by salesforce.com, inc., of San Francisco, Calif., are becoming increasingly popular tools for promoting and enabling interactions between workers inside and outside of an enterprise. An exemplary enterprise social network is described in U.S. Publication No. 2011/0113071 entitled, ENTERPRISE LEVEL BUSINESS INFORMATION NETWORKING FOR CHANGES IN A DATABASE, by Peter Lee et al., filed Nov. 12, 2010, and which is hereby incorporated herein by reference. Such tools, like CHATTER, can provide a centralized area where enterprise users can publish status updates, post and respond to questions, and view recent activity to easily collaborate with each other in a private and secure environment. Collaboration between employees from different areas of the enterprise is promoted, enabling higher levels of information sharing and intelligence transfer compared to traditional communication modes, e.g., phone calls and emails.

Consumer and enterprise social networks are typically populated by human users, and the feeds reflect represent digital versions of human interactions. While CHATTER allows a human user to follow particular innate objects, e.g., records or documents, interactions with electronic devices and/or applications are currently not supported by existing consumer or enterprise social networks. Such interactions, however, would be beneficial so that critical devices and applications that interact with humans could share information on status, behaviors, and/or other useful data, thereby elevating a feed into a single source of information for human users and non-human users alike.

According to exemplary embodiments, an enterprise social network ("ESN") service is provided to improve collaborative interactions in an enterprise between humans and machines. Machines can include, but are not limited to, electronic devices and components, such as computers, servers, switches and routers. In addition, machines can include software entities, such as applications hosted by an electronic device. In an embodiment, the ESN service is configured to treat machines and humans as members of the social network. Accordingly, human users, in an embodiment, can register to follow machines as well as other human users, and groups can include machines and human users alike. In an embodiment, the ESN service is configured to receive from a machine a message that includes an update of the machine's status, and to determine who is a follower of the machine. The ESN service is further configured to post the machine's status update in a feed on a web page associated with a user following the machine's status. In this manner, the following user can be notified of the machine's status update on the following user's home page.

In an embodiment, machine status updates can be automatically categorized and/or tagged based on keywords detected in the messages so that the updates can be searchable and easily sorted. In another embodiment, a human user can interact with the machine directly in response to the machine's status update. In another embodiment, collaborative interactions between machines and humans can be tracked and stored to comply with retention and compliance policies.

Figure 2:
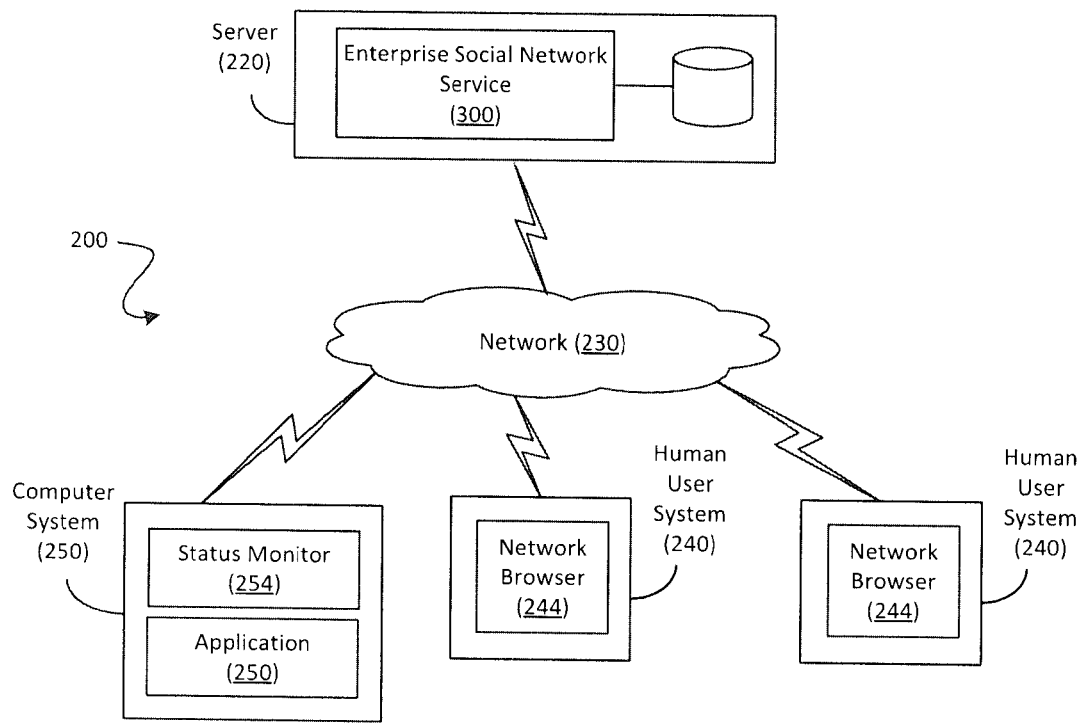
FIG. 2 illustrates a representative system for providing machine status information according to an embodiment.
Figure 3:
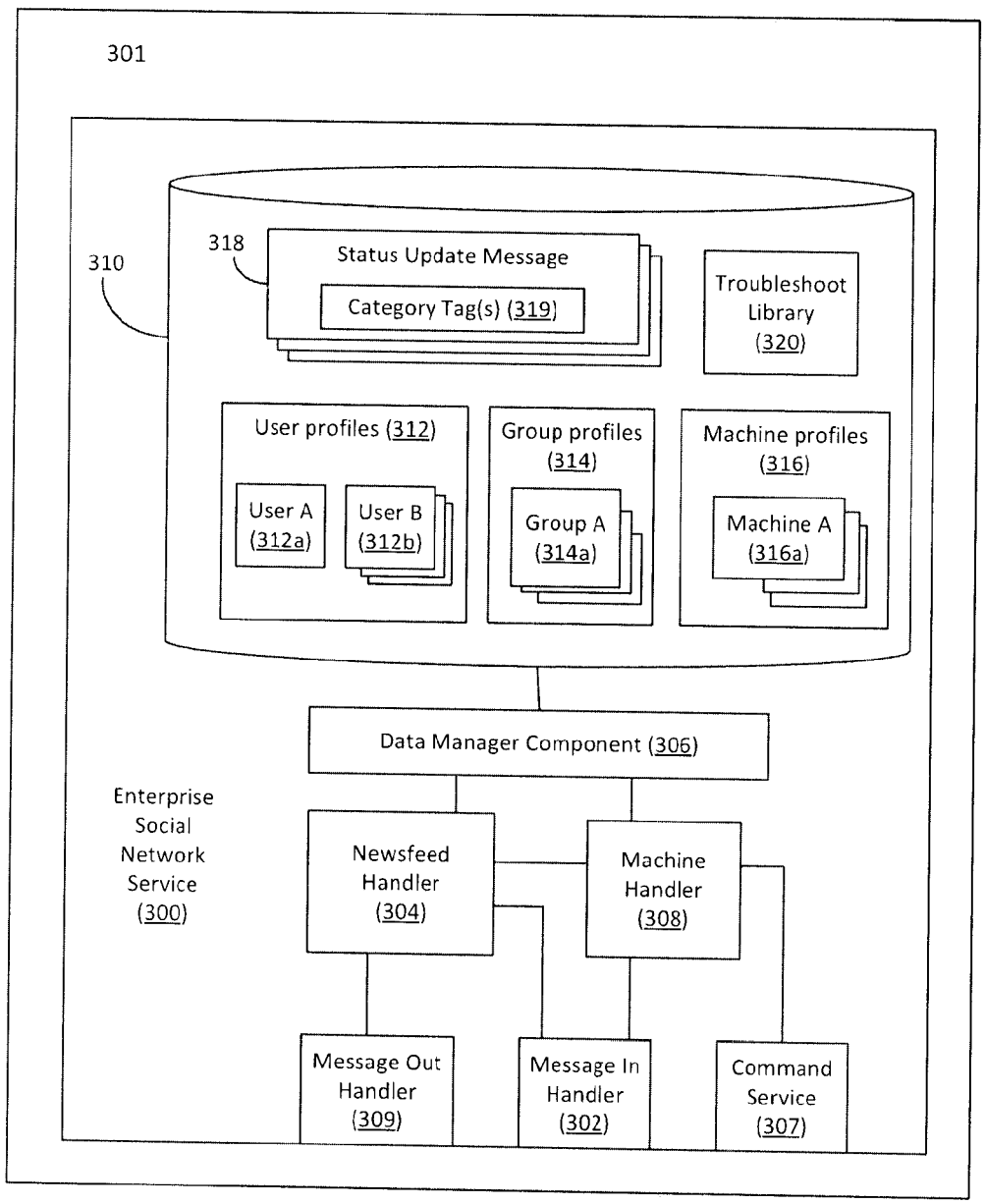
FIG. 3 is a representative system for providing machine status information according to another embodiment.

Referring now to FIG. 1, a flow diagram is presented illustrating a method 100 for providing machine status information via an enterprise social network according to an embodiment. FIG. 2 illustrates a representative system 200 for providing machine status information according to an embodiment, and FIG. 3 is a block diagram illustrating another exemplary system for providing machine status information via an enterprise social network. In particular, FIG. 3 illustrates an arrangement of components configured to implement the method 100 of FIG. 1, which also can be carried out in environments other than that illustrated in FIG. 3.

In FIG. 3, the components are configured to operate within an execution environment hosted by a computer device and/or multiple computer devices, as in a distributed execution environment. Exemplary computer devices can include desktop computers, servers, networking devices, notebook computers, PDAs, mobile phones, digital image capture devices, and the like. For example, FIG. 2 illustrates a plurality of computer devices 220, 240, 250 communicatively coupled to one another via a network 230, such as the Internet, where an application server 220 can be configured to provide an execution environment configured to support the operation of the components illustrated in FIG. 3 and/or their analogs. One example of such a server 220 will be described later in greater detail during reference to later illustrated embodiments.

Illustrated in FIG. 3 is an ESN service 300 including components adapted for operating in an execution environment 301. The execution environment 301, or an analog, can be provided by a computer device such as the application server 220. The ESN service 300 includes a database system that is configured to manage and store a plurality of data objects in a data store 310. As shown, data objects can include, but are limited to, human user profiles 312, group profiles 314, machine profiles 316, and status update messages 318. The data objects can be managed by a data manager 306, which can be configured to add, update, and/or delete data objects. In addition, the data manager 306 can be configured to receive and process data queries and to retrieve data objects satisfying the data queries.

In an embodiment, the database system may be implemented as a multi-tenant database system. As used herein, the term multi-tenant database system refers to those systems in which various elements of hardware and software of the database system may be shared by one or more customers. For example, a given application server may simultaneously process requests for a great number of customers, and a given database table may store rows for a potentially much greater number of customers. As used herein, the term query plan refers to a set of steps used to access information in a database system.

In an embodiment, the ESN service 300 can be configured to receive and send information from and to a human user system 240, e.g., a mobile handheld device or a laptop computer, and from and to a computer system 250 via the network 230. The network 230 may be a Local Area Network (LAN) and/or a Wide Area Network (WAN) including the Internet. The human user system 240 may include an application that allows network communication between the human user system 240 and the ESN service 300. Such an application can be, in an embodiment, a network browser 244 (e.g., Chrome, Internet Explorer, Safari, etc.) or the like that is capable of sending and receiving information to and from the server 220 hosting the ESN service 300. Similarly, the computer system 250 can include a status monitor 254 that is configured to send machine status information to the ESN service 300 according to an embodiment. In another embodiment, the status monitor 254 can be a separate component (not shown) on the network 230 and associated with a plurality of machines 250. In this case, the machine 250 can be configured to transmit its status update to the status monitor 254, which is configured to receive the machine status information and to transmit the status update to the ESN service 300.

FIG. 1, as stated above, illustrates a method for providing machine status information via an enterprise social network according to an embodiment. In this case, the method 100 can be implemented in the context of the server 220 hosting the ESN service 300, but can also be implemented in any desired environment. With reference to FIG. 1, the method 100 begins, in block 102, by receiving a status update message from a machine 250 by the server 220 hosting the ESN service 300. In an embodiment, the status update message includes an identifier of the machine and an indication of a status update of the machine. The ESN service 300 includes means for receiving the message from the machine 250. For example, FIG. 3 illustrates a machine handler 308 in the ESN service 300 configured to receive the status update message from the machine 250, where the status update message includes an identifier of the machine 250 and an indication of a status update of the machine.

In an embodiment, a message-in handler 302 in the ESN service 300 can be configured to receive the status update message from the machine 250 via the network 230. The network 230 can support any protocol compatible with a configuration of the ESN service 300 and/or other components hosted by the server 220 including the ESN service 300.

As noted above, the status update message can be created and transmitted by a status monitor 254 associated with the machine 250. The status monitor 254 can be a commercially available module, such as that developed by EMC Smarts that is configured to monitor one or more computers and/or applications. When a triggering event is detected, the status monitor 254 can be configured to generate and transmit the status update message to a preconfigured destination. The status update message can be formatted and transmitted as an email or text message, or as a post to a feed on a web page. According to an embodiment, the status update message can include a variety of information, including, but not limited to, information identifying the machine 250 and an indication of the status update of the machine. The message-in handler 302 can be configured to determine that the message is from the machine 250, e.g., based on the machine's identifier, and can route the status update message to the machine handler 308.

Referring again to FIG. 1, when the status update message is received, information identifying a first user from a database system is determined in block 104. In an embodiment, the first user follows the status of the machine. According to an embodiment, the machine handler 308 can be configured to determine the information identifying the first user from the database system.

In an embodiment, the machine handler 308 can be configured to determine the information identifying the first user based on the identifier of the machine 250. As noted above, the data store 310 is configured to store user profiles 312, group profiles 314, and machine profiles 316. According to an embodiment, each user, group and machine 250 can be associated with at least one of a user profile 312a, a group profile 314a, and a machine profile 316a. Each profile 312a, 314a, 316a can include information relating to the entity to which it is associated. For example, a user profile of User A 312a can include the user's name and contact information, the user's position in the enterprise, and/or the user's picture. In addition, the profile 312a can include information identifying which entities are following User A and vice versa, i.e., information identifying which entities User A is following. Similarly, a profile of Group A 314a can include the names and contact information of the members of the group, as well as information identifying which entities are following Group A and vice versa. In an embodiment, members of a group can include human users as well as machines 250.

According to an embodiment, the machine handler 308 can be configured to parse the status update message to extract the identifier of the machine 250. Based on the machine identifier, the machine handler 308 can be configured to determine the information identifying the first user. For example, in an embodiment, the machine handler 308 can invoke the data manager component 306 to retrieve a machine profile, e.g., 316a, associated with the machine, e.g., Machine A, based on the machine identifier. The machine profile 316a can include technical information about the machine 250 and a group with which it is associated. In addition, the machine profile 316a can include information identifying entities, e.g., users, groups and/or machines 250, following Machine A including the first user.

Alternatively or additionally, the machine handler 308 can determine based on the machine identifier a group with which the machine is associated, e.g., Group A, and invoke the data manager component 306 to retrieve the group profile, e.g, 314a, associated with Group A. As noted above, the group profile 314a can include the names and contact information of the members of the group, as well as information identifying which entities, including the first user, are following Group A and vice versa.

Referring again to FIG. 1, once the information identifying the first user is determined, a notification message is posted in a feed on a web page associated with the first user (block 106). In an embodiment, the notification message identifies the machine and includes the machine's status update so that when the first user navigates to his or her web page and views the feed, the first user is notified of the status of the machine. According to an embodiment, the machine handler 306 can invoke a newsfeed handler 304 hosted by the ESN service 300 for performing this task.

According to an embodiment, the machine handler 308 can be configured to generate the notification message to be posted in the feed on the web page associated with the first user. In an embodiment, at least a portion of the status update message can comprise computer-readable content that is incomprehensible to a human user because the status update message is generated by the status monitor 254 associated with the machine 250. In this case, the machine handler 308 can be configured to generate the notification message by translating the computer-readable content into human-readable content so that the first user can read and understand the notification message.

Once the notification message is generated, the machine handler 308 can invoke the newsfeed handler 304, which can be configured to post the notification message in the feed on the web page associated with the first user following the machine's status. For example, in an embodiment, when invoked, the newsfeed handler 304 can be configured to retrieve the first user's profile, e.g., User A's profile 312a, via the data manager component 306, and to update the web page associated with the first user with the notification message. The updated web page can be served, via the network 230, to a human user system 240 associated with the first user, which includes a network browser 244 configured to display the web page to the first user.

Figure 4A:
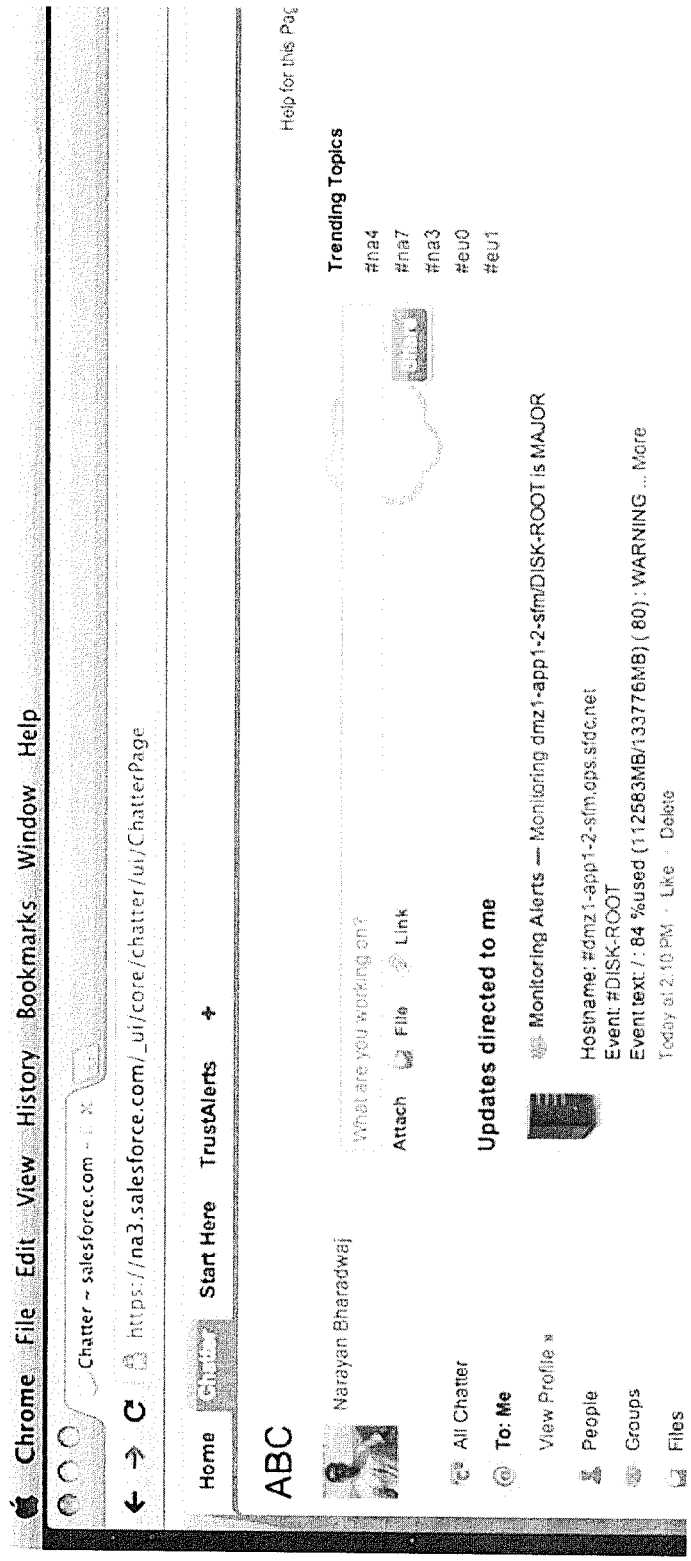
FIG. 4A illustrates a graphical user interface representing a webpage associated with a user according to an exemplary embodiment.

FIG. 4A illustrates a portion of an exemplary web page associated the first user following the machine 250 according to an embodiment. The portion of the exemplary web page 400a represents a portion of a home page for the first user, "Narayan Bharadwaj," and includes a newsfeed under a heading, "Updates directed to me." The notification message is posted in the newsfeed, which includes the following information:

dmz1-app1-2-sfm/DISK-ROOT is MAJOR
    Hostname: #dmz1-app1-2-sfm.ops.sfdc.net
    Event: #DISK-ROOT
    Event text:/: 84% used (112583 MB/133776 MB) (80):
        WARNING . . . More As shown, the notification message identifies the machine, "dmz1-app1-2-sfm.ops.sfdc.net," and includes its status, "84% used (112583 MB/133776 MB) (80)." Specifically, the notification message indicates that 84% of the disk space is used.

Alternatively, or in addition, the newsfeed handler 304 can also be configured to retrieve the machine's profile, e.g., Machine A's profile 316a, and to update the web page associated with the machine with the notification message. Because the first user is following Machine A, the update to Machine A's web page can be propogated to the first user's newsfeed automatically.

Alternatively or in addition, the machine can be associated with a group, e.g., Group A, that is followed by the first user. In this case, the newsfeed handler 304 can be configured to retrieve the group's profile, e.g., Group A's profile 314a, and to update the web page associated with the group with the notification message. Because the first user is following Group A, the update to Group A's web page can be propogated to the first user's newsfeed automatically. Alternatively, or in addition, when the first user is a member of the group, the updated group web page can be served, via the network 230, to the first user.

Figure 4B:
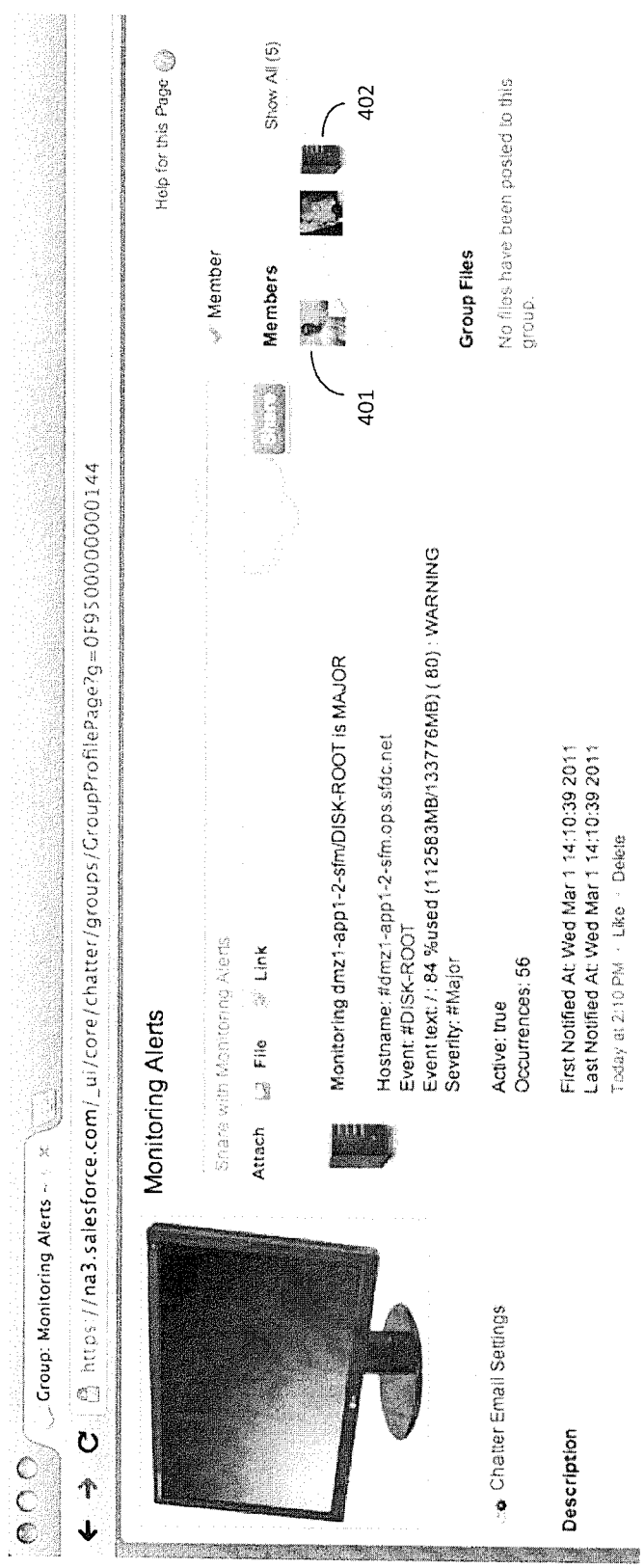
FIG. 4B illustrates a graphical user interface representing a webpage associated with a group according to another exemplary embodiment.

FIG. 4B illustrates a portion of an exemplary web page associated with a group according to an embodiment. The portion of the exemplary web page 400b represents a portion of a home page for a group, "Montiforing Alerts," having members including the first user (represented by a picture 401 of the human user) and the machine 250 (represented by an icon 402). As is shown, the newsfeed includes the same information as that shown in FIG. 4A.

According to an embodiment, in addition to posting the notification message on the first user's web page, the ESN service 300 can be configured to transmit the notification message to the first user via email or text messaging. For example, the newsfeed handler 304 can be configured to invoke a message out handler 309 to format and transmit the notification message to the user system 240 associated with the first user over the network 230. In this manner, the first user can be notified of the status of the machine even when the first user is not logged in to the ESN service 300.

In an embodiment, more than one human user can be configured to follow the machine 250 and/or to be in a group including the machine 250. For example, a system administration team can include many skilled professionals responsible for managing many electronic devices and applications in an enterprise, including the machine 250. Thus, the machine handler 308 can be configured to determine information from the database system identifying a second user, e.g., User B, that also follows the status of the machine based on the machine profile 316a and/or the group profile 314a if the machine is a member of a group. The notification message can be posted in a feed on a web page associated with the second user in the same or a similar manner described above so that the second user is also notified of the status of the machine.

When the first and/or second users receive the machine status update to their respective web pages (or the group web page), either user, in an embodiment, can provide a comment relating to the status of the machine and submit the comment in a comment message to the ESN service 300. The ESN service 300 can be configured to receive the comment message from the first user or the second user in response to the notification message, and to update the feeds on the web pages associated with the first and second users with the comment. For example, the message-in handler 302 can be configured to receive the comment message from the user system 240 associated with the first or second user over the network 230. The comment message can be routed to the newsfeed handler 304b, which is configured to update the appropriate newsfeeds with the comment. In this manner the first and second users can be notified of the comments relating to the status of the machine.

Figure 4C:
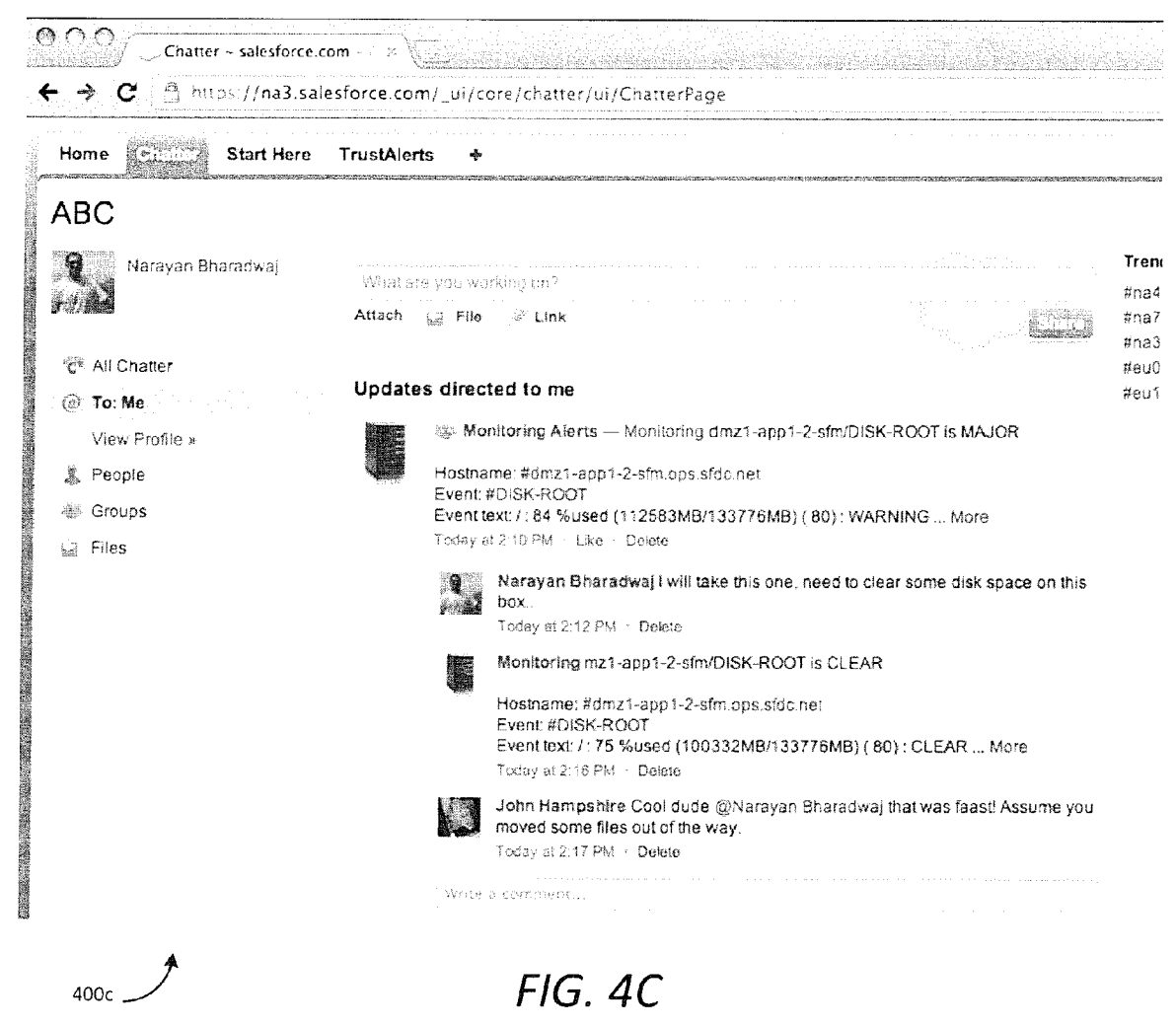

FIG. 4C illustrates another portion of the exemplary web page illustrated in FIG. 4A, where the web page is associated with the first user according to an embodiment. The portion of the exemplary web page 400c includes an updated newsfeed where the first user, Narayan Bharadwaj, has posted a comment that he "will take this one, need to clear some disk space on this box . . . ." After the disk space on the machine is cleared, a follow-up comment from the machine is displayed providing that only 75% disk space is being used, and that the DISK-ROOT is CLEAR. As further shown, another comment from a second user, "John Hampshire," who is also following the status of the machine, is displayed. In this fashion, human users can keep track of events occurring on one or more machines with access to the enterprise social network newsfeed, and can interact and collaborate on the issue accordingly, while creating a record of the interaction for posterity.

In another embodiment, the ESN service 300 can be configured to receive messages relating to the machine's status from sources external to the enterprise social network. For example, the ESN service 300, in an embodiment, can be configured to receive information from other consumer social networks. This is particularly useful when the enterprise provides machines, e.g., services and/or products, that are commented on by customers who do not have access to the enterprise social network, but are members of a consumer social network. Relevant comments relating to a machine's status published to the consumer social network can be integrated with the ESN service 300, in an embodiment, in order to enrich the feed with additional information from external sources. For example, an enterprise customer may comment on the consumer social network that access to his enterprise account is no longer working. When such a comment is published to the consumer social network, the ESN service 300 can be configured to receive the comment in a message from a server associated with the consumer social network, and to post the comment in a notification message in the feed on the web page associated with the first user.

Figure 5:
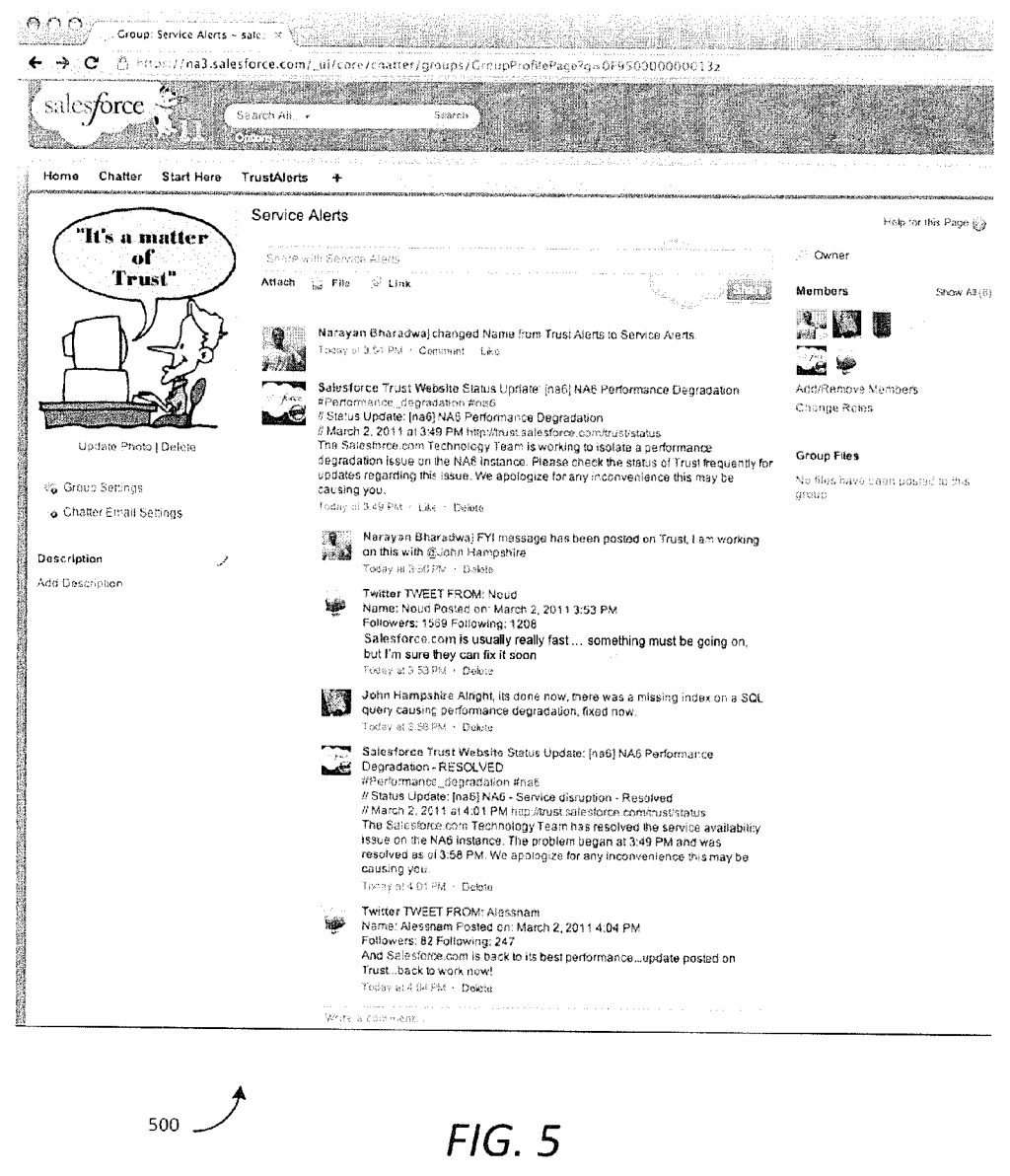

FIG. 5 illustrates a portion of an exemplary web page associated with a group according to an embodiment. The portion of the exemplary web page 500 represents a portion of a home page for a group, "Service Alerts," having members including the first user, a "Salesforce Trust Website" service, and a consumer social network, e.g., "Twitter." As is shown, the feed includes a post indicating a problem with the trust website, followed by a comment by the consumer social network on behalf of a customer "Noud" complaining about the service. The comment is followed by comments by human users fixing the problem, and another comment by the consumer social network on behalf of another customer "Alessnam" praising the restored service.

In another embodiment, the ESN service 300 can be configured to perform various actions in conjunction with posting or publishing to a newsfeed. For example, status update messages that contain certain words can trigger the automatic creation of a "ticket," which could initiate a corrective action process, e.g., logging a ticket and resolving a logged ticket. According to another embodiment, the posted notification message itself could provide a conduit for corrective action. For example, in an embodiment, the first user can launch a console or command line that enables direct access to the machine 250 that published the status update message by, for instance, selecting the notification message in the newsfeed displayed by the network browser 244. In this embodiment, the first user can submit a corrective command via the command line or take other action to remediate a problem with the machine 250. For example, when the notification message indicates that the machine 250 is suffering from network congestion, the first user can launch the command line by, for example, selecting the notification message, and can submit a command that launches a tool for load balancing.

According to an embodiment, when the first user submits the command relating to the status of the machine via the command line in response to the notification message, an indication including the command can be transmitted to the ESN service 300. The ESN service 300 can be configured to receive the indication from the first user and to determine that the indication includes the command. For example, the message-in handler 302 can be configured to receive and route the indication to the machine handler 308 because the indication is in response to the notification message. In response to receiving the indication, in an embodiment, the machine handler 308 can be configured to invoke a command service 307, which executes the command relating to the status of the machine. In this fashion, the ESN service 300 is not just a medium for displaying status messages, but can also be a conduit into the machines 250 that publish the status messages.

Moreover, in another embodiment, a troubleshoot library 320 can be established when a command is received in response to a notification message. For example, the machine handler 308 can be configured to associate the command with the status in the notification message, and store the command and associated status in the troubleshoot library 320 in the data store 310. In an embodiment, when the machine handler 308 receives a status update from a machine 250, one or more commands associated with the received status can be retrieved from the troubleshoot library 320 and included in the notification message posted in the feed associated with the first user. Alternatively or in addition, the machine handler 308 can be configured, in an embodiment, to retrieve the command relating to the status and to invoke automatically the command service 307 to execute the command. The ESN service 300 can be configured to trigger this action under certain circumstances. For example, automatic corrective action can be triggered for particular status types, and/or if after a predetermined time period no remedial action has been taken and the status persists.

According to an embodiment, information relating to a machine, e.g., machine performance and maintenance, can be tracked by collecting and storing status update messages 318 relating to the machines 250. In an embodiment, a status update message 318 can be categorized by one or more category tags 319. At least one category tag 319 related to the status update message can be provided, i.e., extracted or added, and stored with the status update message 318 in the data store 310. For example, in an embodiment, a status update message 318 can be categorized by a status type. In FIG. 5, for instance, a category tag 319, "#Performance_degradation," is provided in the status update message published by the machine, "Trust Website."

In an embodiment, the category tag 319 can include, in an embodiment, at least one alphanumeric character, e.g, "performance_degradation," and a tag indicator, e.g., a hash symbol (#), that precedes and/or follows the alphanumeric character(s). The category tag 319 can be provided by the machine 250 from which the status update message is received, a user following the status of the machine 250, and/or by the ESN service 300. For example, the first user following the status of the machine can manually add a category tag 319 to the status update message 318. Alternatively or in addition, the machine 250 publishing the status update message can be configured to automatically publish a status update message that includes the category tag 319. For example, if the machine 250 is a server, it can be programmed to automatically publish a status update message that includes the #Performance_degradation category tag 319 whenever the server's performance falls out of line with certain pre-determined parameters.

In another embodiment, one or more keywords can be associated with a category tag 319, and when any of the one or more keywords is identified in a status update message, the category tag 319 can be automatically associated with the status update message 318. For example, when a status update message from a server includes a keyword, "100%," a "#load-_capacity" category tag 319 can be automatically added in a comment to the status update message 318. Alternatively or additionally, terms such as "CPU" or "critical" could become categor tags 319 themselves: #CPU and #critical.

Because the status update messages 318 can be categorized by one or more category tags 319, the status update messages 318 can, in an embodiment, be searched and one or more status update messages 318 can be retrieved based on at least one category tag 319. For example, status update messages 318 relating to a particular machine 250 can be retrieved based on a search for a category tag 319 associated with the machine's identifier. Moreover, status update messages 318 relating to the particular machine 250 and to a particular problem, e.g., performance degradation, can be retrieved based on a search for category tags 319 associated with the machine's identifier and with the particular problem. In an embodiment, comments associated with a status update message 318 can be included with the status update message 318 so that when the status update message 318 is retrieved, the status update message 318 and at least a portion the conversation thread, i.e., the comments, are also accessible.

As noted above, a machine 250 can include electronic devices and/or non-human software entities. Accordingly, in an embodiment, the ESN can be a communication medium between human users and non-human software entities. For example, databases, applications, and other running software programs can publish information to their respective newsfeeds about events that are affecting access to those software entities. Human users following the newsfeeds can be notified of these events and can act accordingly, for example, by submitting a corrective command using the command line in the newsfeed, or by taking other actions external to the newsfeed. In this manner, software status update messages can be integrated into the newsfeed ecosphere, which increases collaborative communication and encourages a single source of information for events affecting social network users.

System Overview

Figure 6:
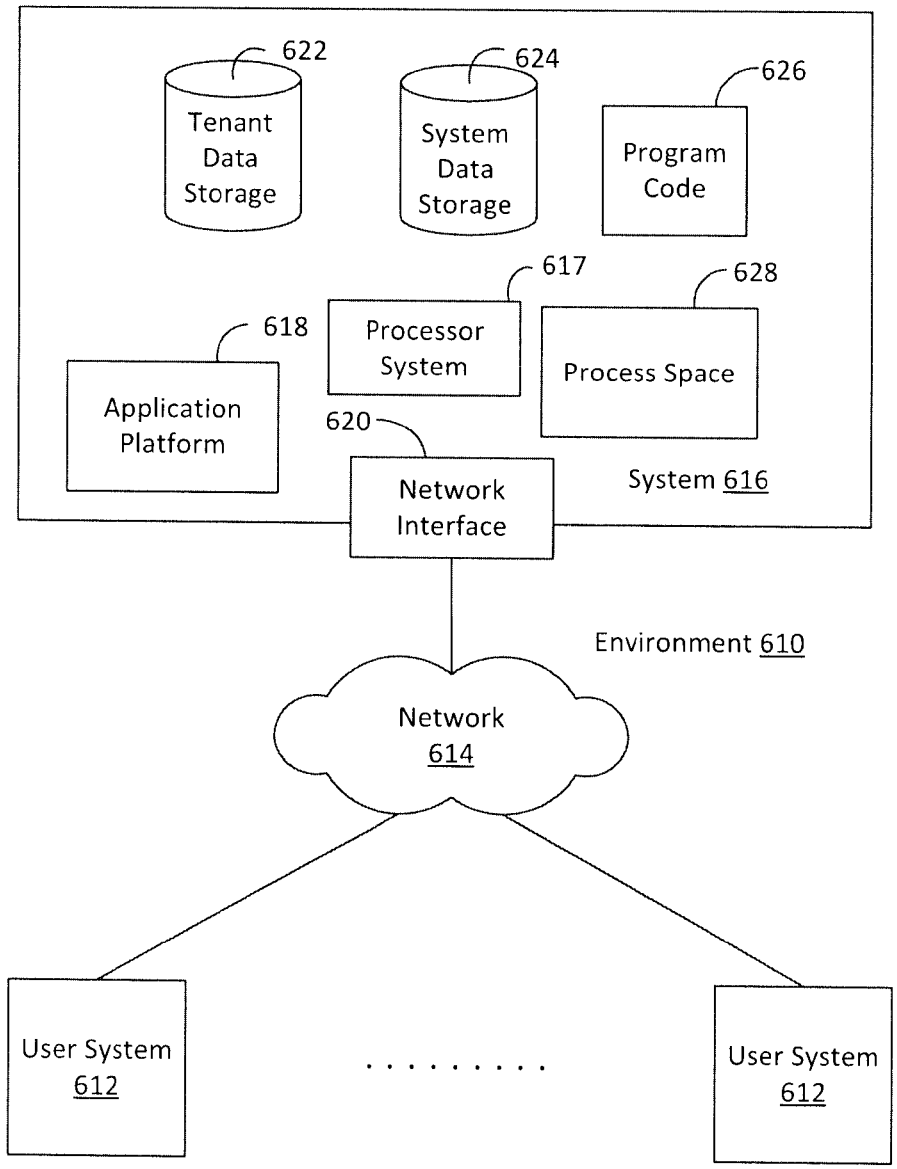
FIG. 6 illustrates a block diagram of an example of an environment wherein an on-demand database service might be used.

FIG. 6 illustrates a block diagram of an environment 610 wherein an on-demand database service might be used. Environment 610 may include user systems 612, network 614, system 616, processor system 617, application platform 618, network interface 620, tenant data storage 622, system data storage 624, program code 626, and process space 628. In other embodiments, environment 610 may not have all of the components listed and/or may have other elements instead of, or in addition to, those listed above.

Environment 610 is an environment in which an on-demand database service exists. User system 612 may be any machine or system that is used by a user to access a database user system. For example, any of user systems 612 can be a handheld computing device, a mobile phone, a laptop computer, a work station, and/or a network of computing devices. As illustrated in FIG. 6 (and in more detail in FIG. 7) user systems 612 might interact via a network 614 with an on-demand database service, which is system 616.

An on-demand database service, such as system 616, is a database system that is made available to outside users that do not need to necessarily be concerned with building and/or maintaining the database system, but instead may be available for their use when the users need the database system (e.g., on the demand of the users). Some on-demand database services may store information from one or more tenants stored into tables of a common database image to form a multi-tenant database system (MTS). Accordingly, "on-demand database service 616" and "system 616" will be used interchangeably herein. A database image may include one or more database objects. A relational database management system (RDMS) or the equivalent may execute storage and retrieval of information against the database object(s). Application platform 618 may be a framework that allows the applications of system 616 to run, such as the hardware and/or software, e.g., the operating system. In an embodiment, on-demand database service 616 may include an application platform 618 that enables creation, managing and executing one or more applications developed by the provider of the on-demand database service, users accessing the on-demand database service via user systems 612, or third party application developers accessing the on-demand database service via user systems 612.

The users of user systems 612 may differ in their respective capacities, and the capacity of a particular user system 612 might be entirely determined by permissions (permission levels) for the current user. For example, where a salesperson is using a particular user system 612 to interact with system 616, that user system has the capacities allotted to that salesperson. However, while an administrator is using that user system to interact with system 616, that user system has the capacities allotted to that administrator. In systems with a hierarchical role model, users at one permission level may have access to applications, data, and database information accessible by a lower permission level user, but may not have access to certain applications, database information, and data accessible by a user at a higher permission level. Thus, different users will have different capabilities with regard to accessing and modifying application and database information, depending on a user's security or permission level.

Network 614 is any network or combination of networks of devices that communicate with one another. For example, network 614 can be any one or any combination of a LAN (local area network), WAN (wide area network), telephone network, wireless network, point-to-point network, star network, token ring network, hub network, or other appropriate configuration. As the most common type of computer network in current use is a TCP/IP (Transfer Control Protocol and Internet Protocol) network, such as the global internetwork of networks often referred to as the "Internet" with a capital "I," that network will be used in many of the examples herein. However, it should be understood that the networks that the one or more implementations might use are not so limited, although TCP/IP is a frequently implemented protocol.

User systems 612 might communicate with system 616 using TCP/IP and, at a higher network level, use other common Internet protocols to communicate, such as HTTP, FTP, AFS, WAP, etc. In an example where HTTP is used, user system 612 might include an HTTP client commonly referred to as a "browser" for sending and receiving HTTP messages to and from an HTTP server at system 616. Such an HTTP server might be implemented as the sole network interface between system 616 and network 614, but other techniques might be used as well or instead. In some implementations, the interface between system 616 and network 614 includes load sharing functionality, such as round-robin HTTP request distributors to balance loads and distribute incoming HTTP requests evenly over a plurality of servers. At least as for the users that are accessing that server, each of the plurality of servers has access to the MTS' data; however, other alternative configurations may be used instead.

In one embodiment, system 616, shown in FIG. 6, implements a web-based customer relationship management (CRM) system. For example, in one embodiment, system 616 includes application servers configured to implement and execute CRM software applications as well as provide related data, code, forms, webpages and other information to and from user systems 612 and to store to, and retrieve from, a database system related data, objects, and Webpage content. With a multi-tenant system, data for multiple tenants may be stored in the same physical database object, however, tenant data typically is arranged so that data of one tenant is kept logically separate from that of other tenants so that one tenant does not have access to another tenant's data, unless such data is expressly shared. In certain embodiments, system 616 implements applications other than, or in addition to, a CRM application. For example, system 616 may provide tenant access to multiple hosted (standard and custom) applications, including a CRM application. User (or third party developer) applications, which may or may not include CRM, may be supported by the application platform 618, which manages creation, storage of the applications into one or more database objects and executing of the applications in a virtual machine in the process space of the system 616.

One arrangement for elements of system 616 is shown in FIG. 6, including a network interface 620, application platform 618, tenant data storage 622 for tenant data 623, system data storage 624 for system data 625 accessible to system 616 and possibly multiple tenants, program code 626 for implementing various functions of system 616, and a process space 628 for executing MTS system processes and tenant-specific processes, such as running applications as part of an application hosting service. Additional processes that may execute on system 616 include database indexing processes.

Several elements in the system shown in FIG. 6 include conventional, well-known elements that are explained only briefly here. For example, each user system 612 could include a desktop personal computer, workstation, laptop, PDA, cell phone, or any wireless access protocol (WAP) enabled device or any other computing device capable of interfacing directly or indirectly to the Internet or other network connection. User system 612 typically runs an HTTP client, e.g., a browsing program, such as Microsoft's Internet Explorer browser, Netscape's Navigator browser, Opera's browser, or a WAP-enabled browser in the case of a cell phone, PDA or other wireless device, or the like, allowing a user (e.g., subscriber of the multi-tenant database system) of user system 612 to access, process and view information, pages and applications available to it from system 616 over network 614. Each user system 612 also typically includes one or more user interface devices, such as a keyboard, a mouse, trackball, touch pad, touch screen, pen or the like, for interacting with a graphical user interface (GUI) provided by the browser on a display (e.g., a monitor screen, LCD display, etc.) in conjunction with pages, forms, applications and other information provided by system 616 or other systems or servers. For example, the user interface device can be used to access data and applications hosted by system 616, and to perform searches on stored data, and otherwise allow a user to interact with various GUI pages that may be presented to a user. As discussed above, embodiments are suitable for use with the Internet, which refers to a specific global internetwork of networks. However, it should be understood that other networks can be used instead of the Internet, such as an intranet, an extranet, a virtual private network (VPN), a non-TCP/IP based network, any LAN or WAN or the like.

According to one embodiment, each user system 612 and all of its components are operator configurable using applications, such as a browser, including computer code run using a central processing unit such as an Intel Pentium® processor or the like. Similarly, system 616 (and additional instances of an MTS, where more than one is present) and all of their components might be operator configurable using application(s) including computer code to run using a central processing unit such as processor system 617, which may include an Intel Pentium® processor or the like, and/or multiple processor units. A computer program product embodiment includes a machine-readable storage medium (media) having instructions stored thereon/in which can be used to program a computer to perform any of the processes of the embodiments described herein. Computer code for operating and configuring system 616 to intercommunicate and to process webpages, applications and other data and media content as described herein are preferably downloaded and stored on a hard disk, but the entire program code, or portions thereof, may also be stored in any other volatile or non-volatile memory medium or device as is well known, such as a ROM or RAM, or provided on any media capable of storing program code, such as any type of rotating media including floppy disks, optical discs, digital versatile disk (DVD), compact disk (CD), microdrive, and magneto-optical disks, and magnetic or optical cards, nanosystems (including molecular memory ICs), or any type of media or device suitable for storing instructions and/or data. Additionally, the entire program code, or portions thereof, may be transmitted and downloaded from a software source over a transmission medium, e.g., over the Internet, or from another server, as is well known, or transmitted over any other conventional network connection as is well known (e.g., extranet, VPN, LAN, etc.) using any communication medium and protocols (e.g., TCP/IP, HTTP, HTTPS, Ethernet, etc.) as are well known. It will also be appreciated that computer code for implementing embodiments can be implemented in any programming language that can be executed on a client system and/or server or server system such as, for example, C, C++, HTML, any other markup language, Java™, JavaScript, ActiveX, any other scripting language, such as VBScript, and many other programming languages as are well known may be used. (Java™ is a trademark of Sun Microsystems, Inc.).

According to one embodiment, each system 616 is configured to provide webpages, forms, applications, data and media content to user (client) systems 612 to support the access by user systems 612 as tenants of system 616. As such, system 616 provides security mechanisms to keep each tenant's data separate unless the data is shared. If more than one MTS is used, they may be located in close proximity to one another (e.g., in a server farm located in a single building or campus), or they may be distributed at locations remote from one another (e.g., one or more servers located in city A and one or more servers located in city B). As used herein, each MTS could include one or more logically and/or physically connected servers distributed locally or across one or more geographic locations. Additionally, the term "server" is meant to include a computer system, including processing hardware and process space(s), and an associated storage system and database application (e.g., OODBMS or RDBMS) as is well known in the art. It should also be understood that "server system" and "server" are often used interchangeably herein. Similarly, the database object described herein can be implemented as single databases, a distributed database, a collection of distributed databases, a database with redundant online or offline backups or other redundancies, etc., and might include a distributed database or storage network and associated processing intelligence.

Figure 7:
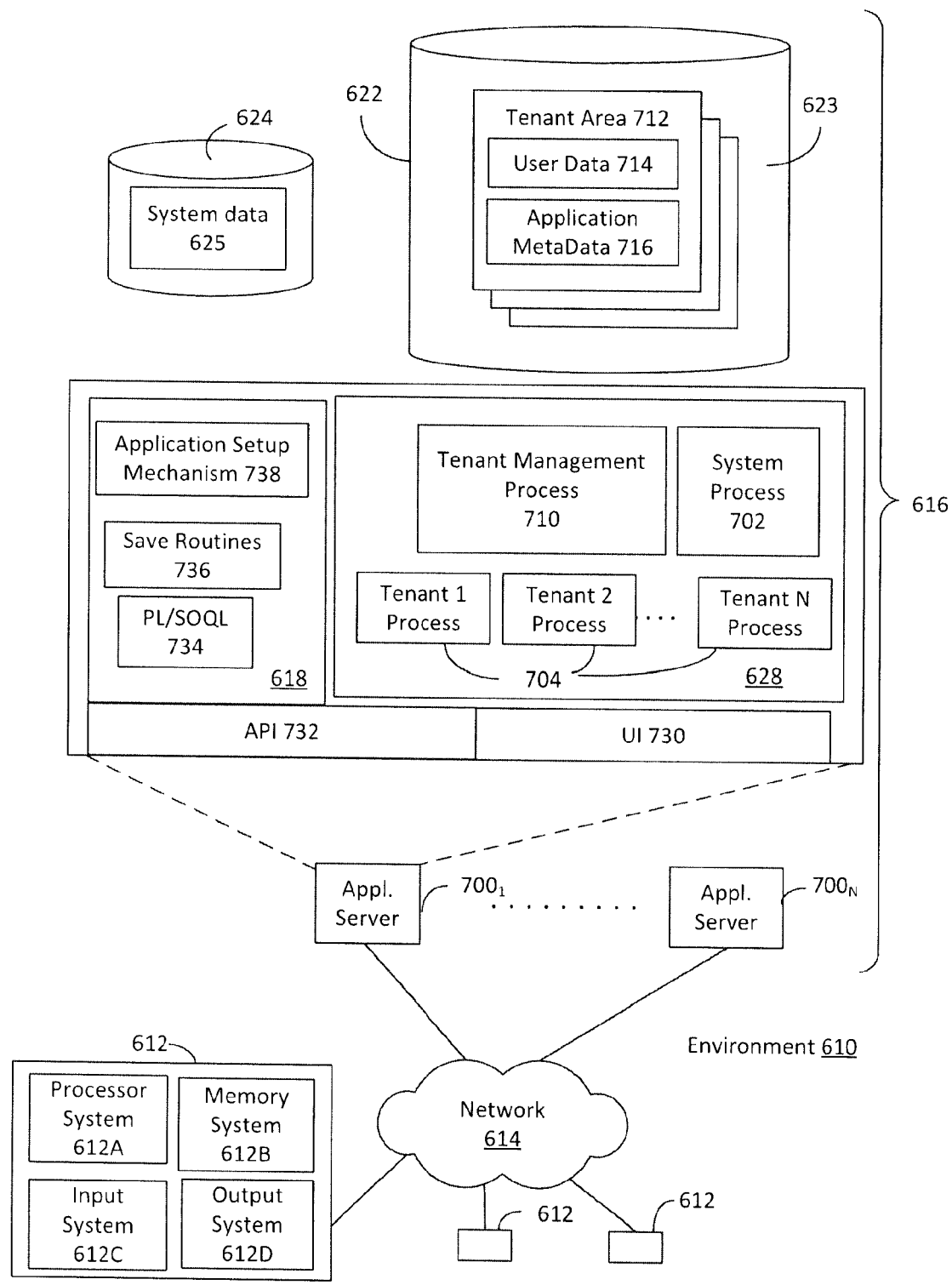
FIG. 7 illustrates a block diagram of an embodiment of elements of FIG. 6 and various possible interconnections between these elements.

FIG. 7 also illustrates environment 610. However, in FIG. 7 elements of system 616 and various interconnections in an embodiment are further illustrated. FIG. 7 shows that user system 612 may include processor system 612A, memory system 612B, input system 612C, and output system 612D. FIG. 7 shows network 614 and system 616. FIG. 7 also shows that system 616 may include tenant data storage 622, tenant data 623, system data storage 624, system data 625, User Interface (UI) 730, Application Program Interface (API) 732, PL/SOQL 734, save routines 736, application setup mechanism 738, applications servers 700$_1$-700$_N$, system process space 702, tenant process spaces 704, tenant management process space 710, tenant storage area 712, user data storage 714, and application metadata 716. In other embodiments, environment 610 may not have the same elements as those listed above and/or may have other elements instead of, or in addition to, those listed above.

User system 612, network 614, system 616, tenant data storage 622, and system data storage 624 were discussed above in FIG. 6. Regarding user system 612, processor system 612A may be any combination of one or more processors. Memory system 612B may be any combination of one or more memory devices, short term, and/or long term memory. Input system 612C may be any combination of input devices, such as one or more keyboards, mice, trackballs, scanners, cameras, and/or interfaces to networks. Output system 612D may be any combination of output devices, such as one or more monitors, printers, and/or interfaces to networks. As shown by FIG. 7, system 616 may include a network interface 620 (of FIG. 6) implemented as a set of HTTP application servers 700$_1$-700$_N$, an application platform 618, tenant data storage 622, and system data storage 624. Also shown is system process space 702, including individual tenant process spaces 704 and a tenant management process space 710. Each application server 700$_1$-700$_N$ may be configured to tenant data storage 622 and the tenant data 623 therein, and system data storage 624 and the system data 625 therein to serve requests of user systems 612. The tenant data 623 might be divided into individual tenant storage areas 712, which can be either a physical arrangement and/or a logical arrangement of data. Within each tenant storage area 712, user data storage 714 and application metadata 716 might be similarly allocated for each user. For example, a copy of a user's most recently used (MRU) items might be stored to user data storage 714. Similarly, a copy of MRU items for an entire organization that is a tenant might be stored to tenant storage area 712. A UI 730 provides a user interface and an API 732 provides an application programmer interface to system 616 resident processes to users and/or developers at user systems 612. The tenant data 623 and the system data 625 may be stored in various databases, such as one or more Oracle™ databases.

Application platform 618 includes an application setup mechanism 738 that supports application developers' creation and management of applications, which may be saved as metadata into tenant data storage 622 by save routines 736 for execution by subscribers as one or more tenant process spaces 704 managed by tenant management process 710 for example. Invocations to such applications may be coded using PL/SOQL 734 that provides a programming language style interface extension to API 732. A detailed description of some PL/SOQL language embodiments is discussed in commonly owned U.S. Pat. No. 7,730,478 entitled, METHOD AND SYSTEM FOR ALLOWING ACCESS TO DEVELOPED APPLICATIONS VIA A MULTI-TENANT ON-DEMAND DATABASE SERVICE, by Craig Weissman, filed Sep. 21, 2007, which is incorporated in its entirety herein for all purposes. Invocations to applications may be detected by one or more system processes, which manages retrieving application metadata 716 for the subscriber making the invocation and executing the metadata as an application in a virtual machine.

Each application server $700_1$-$700_N$ may be communicably coupled to database systems, e.g., having access to system data 625 and tenant data 623, via a different network connection. For example, one application server $700_1$ might be coupled via the network 614 (e.g., the Internet), another application server $700_{N-1}$ might be coupled via a direct network link, and another application server $700_N$ might be coupled by yet a different network connection. Transfer Control Protocol and Internet Protocol (TCP/IP) are typical protocols for communicating between application servers $700_1$-$700_N$ and the database system. However, it will be apparent to one skilled in the art that other transport protocols may be used to optimize the system depending on the network interconnect used.

In certain embodiments, each application server $700_1$-$700_N$ is configured to handle requests for any user associated with any organization that is a tenant. Because it is desirable to be able to add and remove application servers from the server pool at any time for any reason, there is preferably no server affinity for a user and/or organization to a specific application server $700_1$-$700_N$. In one embodiment, therefore, an interface system implementing a load balancing function (e.g., an F5 Big-IP load balancer) is communicably coupled between the application servers $700_1$-$700_N$ and the user systems 612 to distribute requests to the application servers $700_1$-$700_N$. In one embodiment, the load balancer uses a least connections algorithm to route user requests to the application servers $700_1$-$700_N$. Other examples of load balancing algorithms, such as round robin and observed response time, also can be used. For example, in certain embodiments, three consecutive requests from the same user could hit three different application servers $700_1$-$700_N$, and three requests from different users could hit the same application server $700_1$-$700_N$. In this manner, system 616 is multi-tenant, wherein system 616 handles storage of, and access to, different objects, data and applications across disparate users and organizations.

As an example of storage, one tenant might be a company that employs a sales force where each salesperson uses system 616 to manage their sales process. Thus, a user might maintain contact data, leads data, customer follow-up data, performance data, goals and progress data, etc., all applicable to that user's personal sales process (e.g., in tenant data storage 622). In an example of a MTS arrangement, since all of the data and the applications to access, view, modify, report, transmit, calculate, etc., can be maintained and accessed by a user system having nothing more than network access, the user can manage his or her sales efforts and cycles from any of many different user systems. For example, if a salesperson is visiting a customer and the customer has Internet access in their lobby, the salesperson can obtain critical updates as to that customer while waiting for the customer to arrive in the lobby.

While each user's data might be separate from other users' data regardless of the employers of each user, some data might be organization-wide data shared or accessible by a plurality of users or all of the users for a given organization that is a tenant. Thus, there might be some data structures managed by system 616 that are allocated at the tenant level while other data structures might be managed at the user level. Because an MTS might support multiple tenants including possible competitors, the MTS should have security protocols that keep data, applications, and application use separate. Also, because many tenants may opt for access to an MTS rather than maintain their own system, redundancy, up-time, and backup are additional functions that may be implemented in the MTS. In addition to user-specific data and tenant specific data, system 616 might also maintain system level data usable by multiple tenants or other data. Such system level data might include industry reports, news, postings, and the like that are sharable among tenants.

In certain embodiments, user systems 612 (which may be client systems) communicate with application servers $700_1$-$700_N$ to request and update system-level and tenant-level data from system 616 that may require sending one or more queries to tenant data storage 622 and/or system data storage 624. System 616 (e.g., an application server $700_1$ in system 616) automatically generates one or more SQL statements (e.g., one or more SQL queries) that are designed to access the desired information. System data storage 624 may generate query plans to access the requested data from the database.

Each database can generally be viewed as a collection of objects, such as a set of logical tables, containing data fitted into predefined categories. A "table" is one representation of a data object, and may be used herein to simplify the conceptual description of objects and custom objects. It should be understood that "table" and "object" may be used interchangeably herein. Each table generally contains one or more data categories logically arranged as columns or fields in a viewable schema. Each row or record of a table contains an instance of data for each category defined by the fields. For example, a CRM database may include a table that describes a customer with fields for basic contact information such as name, address, phone number, fax number, etc. Another table might describe a purchase order, including fields for information such as customer, product, sale price, date, etc. In some multi-tenant database systems, standard entity tables might be provided for use by all tenants. For CRM database applications, such standard entities might include tables for Account, Contact, Lead, and Opportunity data, each containing pre-defined fields. It should be understood that the word "entity" may also be used interchangeably herein with "object" and "table".

In some multi-tenant database systems, tenants may be allowed to create and store custom objects, or they may be allowed to customize standard entities or objects, for example by creating custom fields for standard objects, including custom index fields. U.S. Pat. No. 7,779,039, filed Apr. 2, 2004, entitled "CUSTOM ENTITIES AND FIELDS IN A MULTI-TENANT DATABASE SYSTEM," and which is hereby incorporated herein by reference, teaches systems and methods for creating custom objects as well as customizing standard objects in a multi-tenant database system. In certain embodiments, for example, all custom entity data rows are stored in a single multi-tenant physical table, which may contain multiple logical tables per organization. It is transparent to customers that their multiple "tables" are in fact stored in one large table or that their data may be stored in the same table as the data of other customers.

While one or more implementations and techniques have been described with reference to an embodiment in which techniques for providing machine status information in a system having an application server providing a front end for an on-demand database service capable of supporting multiple tenants, the one or more implementations and techniques are not limited to multi-tenant databases nor deployment on application servers. Embodiments may be practiced using other database architectures, i.e., ORACLE®, DB2® by IBM and the like without departing from the scope of the embodiments claimed.

Any of the above embodiments may be used alone or together with one another in any combination. The one or more implementations encompassed within this specification may also include embodiments that are only partially mentioned or alluded to or are not mentioned or alluded to at all. Although various embodiments may have been motivated by various deficiencies with the prior art, which may be discussed or alluded to in one or more places in the specification, the embodiments do not necessarily address any of these deficiencies. In other words, different embodiments may address different deficiencies that may be discussed in the specification. Some embodiments may only partially address some deficiencies or just one deficiency that may be discussed in the specification, and some embodiments may not address any of these deficiencies.

While one or more implementations have been described by way of example and in terms of the specific embodiments, it is to be understood that one or more implementations are not limited to the disclosed embodiments. To the contrary, it is intended to cover various modifications and similar arrangements as would be apparent to those skilled in the art. Therefore, the scope of the appended claims should be accorded the broadest interpretation so as to encompass all such modifications and similar arrangements.

The invention claimed is:

1. A method for providing machine status information via an enterprise social network, the method comprising:
   receiving, by a server, a status update message generated automatically by a machine upon occurrence of a triggering event related to performance or maintenance of the machine, wherein the status update message includes a machine identifier and a machine status related to performance or maintenance of the machine;
   identifying, by the server, a first user from a database system, wherein the first user follows the machine status; and
   posting, by the server, a notification message to a feed on a web page associated with the first user, the notification message identifying the machine from the machine identifier and including the machine status, such that the first user is notified of the machine status.

2. The method of claim 1 wherein receiving the status update message comprises receiving the status update message over a network, wherein the network is at least one of a public and a private network, and wherein the database system is a multi-tenant on-demand database system.

3. The method of claim 1 wherein determining the information identifying the first user is based on the machine identifier.

4. The method of claim 1 wherein the machine is one of an electronic device and a software application hosted by an electronic device.

5. The method of claim 1 wherein the status update message comprises computer-readable content, the method further comprising generating the notification message by translating the computer-readable content into human-readable content.

6. The method of claim 1 further comprising posting, by the server, the notification message to a feed on a webpage associated with the machine.

7. The method of claim 1 wherein the machine is associated with a group and the method further comprises posting the notification message to a feed on a webpage associated with the group.

8. The method of claim 1 wherein after receiving the status update message from the machine, the method further comprising:
   determining, by the server, information identifying, by the server, a second user from the database system, wherein the second user follows the machine status;
   posting, by the server, the notification message to a feed on a webpage associated with the second user, such that the second user is notified of the machine status;
   receiving, by the server, a comment message from one of the first user and the second user, wherein the comment message is in response to the notification message and includes a comment relating to the machine status; and
   updating, by the server, the feeds on the web pages associated with the first and second users with the comment message, such that the first and second users are notified of the comment relating to the machine status.

9. The method of claim 1 further comprising transmitting, by the server, the notification message to a user system associated with the first user over a network.

10. The method of claim 1 further comprising:
    providing at least one category tag related to the status update message; and
    storing the status update message and the at least one category tag in the database.

11. The method of claim 10 further comprising retrieving, by the server, the status update message based on the at least one category tag associated with the status update message.

12. The method of claim 10 wherein a category tag comprises at least one alphanumeric character and a tag indicator, and wherein the tag indicator at least one of precedes and follows the at least one alphanumeric character.

13. The method of claim 10 wherein the at least one category tag is provided by at least one of the machine from which the status update message is received, a user following the machine status, and the server receiving the status update message.

14. The method of claim 10 wherein a category tag is associated with at least one keyword, and wherein providing the at least one category tag includes:
   identifying a keyword associated with the category tag in the status update message; and
   automatically associating the determined category tag with the status update message.

15. The method of claim 1 further comprising:
   receiving, by the server, an indication from the first user, wherein the indication is in response to the notification message and includes a command relating to the status update message of the machine; and
   in response to receiving the indication, invoking, by the server, a service configured to execute the command relating to the status update message of the machine.

16. The method of claim 15 further comprising storing the command relating to the status update message in a troubleshoot library in the database system.

17. The method of claim 1 further comprising:
   receiving, by the server, a comment message from a second server associated with an external social network, the comment message including a comment relating to the machine status; and
   posting, by the server, a second notification message in to the feed on the webpage associated with the first user, the second notification message including the comment relating to the machine status.

18. A non-transitory machine-readable medium carrying one or more sequences of instructions for providing machine status information via an enterprise social network, which instructions, when executed by one or more processors, cause the one or more processors to carry out the steps of:
   receiving, by a server, a status update message generated automatically by a machine upon occurrence of a triggering event related to performance or maintenance of the machine, wherein the status update message includes a machine identifier and a machine status related to performance or maintenance of the machine;
   identifying, by the server, a first user from a database system, wherein the first user follow the machine status; and
   posting, by the server, a notification message to a feed on a web page associated with the first user, the notification message identifying the machine from the machine identifier and including the machine status, such that the first user is notified of the machine status.

19. An apparatus for providing machine status information via an enterprise social network, the apparatus comprising:
   a processor; and
   one or more stored sequences of instructions which, when executed by the processor, cause the processor to carry out the steps of:
   receiving, by a server, a status update message generated automatically by a machine upon occurrence of a triggering event related to performance or maintenance of the machine, wherein the status update message includes a machine identifier and a machine status related to performance or maintenance of the machine;
   identifying, by the server, a first user from a database system, wherein the first user follow the machine status; and
   posting, by the server, a notification message to a feed on a web page associated with the first user, the notification message identifying the machine from the machine identifier and including the machine status, such that the first user is notified of the machine status.

20. A method for transmitting code for providing machine status information via an enterprise social network on a transmission medium, the method comprising:
   transmitting code to receive, by a server, a status update message generated automatically by a machine upon occurrence of a triggering event related to performance or maintenance of the machine, wherein the status update message includes a machine identifier a machine status related to performance or maintenance of the machine;
   transmitting code to identify, by the server, a first user from a database system, wherein the first user follow the machine status; and
   transmitting code to post, by the server, a notification message to a feed on a web page associated with the first user, the notification message identifying the machine from the machine identifier and including the machine status, such that the first user is notified of the machine status.

* * * * *